United States Patent
Ko et al.

(10) Patent No.: US 10,284,297 B1
(45) Date of Patent: May 7, 2019

(54) BTS APPARATUS FOR LICENSED-ASSISTED ACCESS

(71) Applicant: ADRFKOREA, Inc., Icheon-si, Gyeonggi-do (KR)

(72) Inventors: Young hoon Ko, Icheon-si (KR); Chan ki Cho, Icheon-si (KR); Baek yong Park, Yeoju-si (KR)

( * ) Notice: Subject to any disclaimer, the term of this patent is extended or adjusted under 35 U.S.C. 154(b) by 0 days.

(21) Appl. No.: 15/954,061

(22) Filed: Apr. 16, 2018

(30) Foreign Application Priority Data

Jan. 11, 2018 (KR) .................. 10-2018-0003918

(51) Int. Cl.
| | |
|---|---|
| *H04B 10/40* | (2013.01) |
| *H04B 10/50* | (2013.01) |
| *H04B 10/60* | (2013.01) |
| *H04Q 11/00* | (2006.01) |
| *H04B 10/079* | (2013.01) |
| *H04B 10/2575* | (2013.01) |

(52) U.S. Cl.
CPC . *H04B 10/25759* (2013.01); *H04B 10/07955* (2013.01); *H04Q 11/0067* (2013.01); *H04Q 11/0071* (2013.01); *H04B 10/40* (2013.01); *H04B 10/50* (2013.01); *H04B 10/60* (2013.01); *H04B 2210/006* (2013.01)

(58) Field of Classification Search
None
See application file for complete search history.

(56) References Cited

U.S. PATENT DOCUMENTS

| | | | | |
|---|---|---|---|---|
| 2005/0176458 | A1* | 8/2005 | Shklarsky | H04N 7/10 455/523 |
| 2007/0008939 | A1* | 1/2007 | Fischer | H04W 88/085 370/338 |
| 2010/0296816 | A1* | 11/2010 | Larsen | H04B 10/25754 398/116 |
| 2011/0135308 | A1* | 6/2011 | Tarlazzi | H04B 7/0413 398/79 |
| 2012/0163431 | A1* | 6/2012 | Wiwel | H04L 27/01 375/219 |
| 2014/0050212 | A1* | 2/2014 | Braz | H04J 1/08 370/343 |
| 2014/0064730 | A1* | 3/2014 | Ko | H04B 10/2575 398/67 |
| 2018/0219715 | A1* | 8/2018 | Park | H04B 10/272 |

* cited by examiner

*Primary Examiner* — Darren E Wolf
(74) *Attorney, Agent, or Firm* — Lee & Associates, LLC

(57) ABSTRACT

Provided is a base transceiver station (BTS) apparatus that enables a licensed-assisted access (LAA) service in a licensed band and an unlicensed band. The BTS apparatus includes a head end connected to a BTS for each of multiple bands and carriers through a radio frequency (RF) line and a remote portion connected to one of optic lines that are optically expanded from the head end.

5 Claims, 10 Drawing Sheets

- Prior Art –

BTS APPARATUS FOR LICENSED-ASSISTED ACCESS

CROSS-REFERENCE TO RELATED APPLICATION(S)

This patent application claims the priority benefit of Korean Patent Application No. 10-2018-0003918 filed on Jan. 11, 2018, in the Korean Intellectual Property Office, the entire contents of which are incorporated by reference herein.

TECHNICAL FIELD

One or more example embodiments relate to a base transceiver station (BTS) apparatus interfacing with a BTS and configured to enable licensed-assisted access (LAA) to an unlicensed spectrum.

BACKGROUND

A base transceiver station (BTS) apparatus for licensed-assisted access (LAA) to an unlicensed spectrum, for example, a "Distributed Antenna System Supporting Multiband" disclosed in Korean Patent Registration No. 10-1463239 (registered on Nov. 12, 2014), may interface with a BTS for LAA, and transmit a service signal to user equipment (UE) in a shadow zone in one direction and transmit an LAA signal of the UE to the BTS in an opposite direction, thereby enabling an LAA service for an unlicensed spectrum, or an unlicensed band frequency aggregation service.

LAA is a technology needed to meet a growing market demand for high-speed data communications for mobile communication systems. However, not all existing BTS apparatuses interfacing with a BTS support LAA to an unlicensed spectrum, and thus such a lack of support limits the provision of an LAA service.

Accordingly, a BTS apparatus that supports LAA to an unlicensed spectrum is needed to improve the situation described above.

SUMMARY

An aspect provides a base transceiver station (BTS) apparatus that enables a licensed-assisted access (LAA) service for an unlicensed spectrum.

According to an aspect, there is provided a BTS apparatus for LAA. The BTS apparatus may include a head end and a remote portion. The head end may perform level monitoring and gain control for each band or carrier on a downlink (DL) signal input from a BTS being present for each of multiple bands and carriers and including LAA for a licensed spectrum and an unlicensed spectrum, combine respective signals for the carriers into a single line and transmit a signal obtained through the combining to the remote portion, and also adjust an uplink (UL) signal input from the remote portion by a level desirable for each of the carriers and transmit an adjusted signal to the BTS for each of the carriers. The head end may include a point of interface (POI) interfacing with the BTS for each of the bands through a radio frequency (RF) line, and configured to separate a BTS signal into a DL path and an UL path and adjust a signal by a specified gain and monitor a level.

The head end may also include an LAA POI (LPOI) interfacing with an LAA BTS (LBTS) through an RF line, and configured to separate a BTS signal into a DL path and an UL path and adjust a signal by a specified gain and monitor a level.

The head end may also include a head end combiner (HCOM) connected to the POI for each of the bands and the LPOI, and configured to combine POI signals and transmit a signal obtained through the combining to an optic distribution unit (ODU) in downlink, and also configured to distribute a signal of the ODU to the POI and the LPOI in uplink.

The head end may also include the ODU connected to the HCOM, and configured to perform electric to optic conversion and optic distribution and transmit an obtained signal to the remote portion through an optic line in downlink, and also configured to perform optic to electric conversion on an optic signal transmitted from the remote portion through the optic line and transmit an obtained signal to the HCOM in uplink.

In addition, the remote portion may include an optic remote unit (ORU) optically connected to the head end, and configured to perform optic to electric conversion and transmit an obtained signal to a remote module (RM) in downlink, and also configured to perform electric to optic conversion on a signal transmitted from the RM and transmit an obtained signal to the ODU of the head end through the optic line in uplink.

The remote portion may also include the RM classified by each of the bands and connected to the ORU and configured to separate a DL path and an UL path, and configured to adjust a signal by a specified level, monitor a level, perform high-power amplification, and transmit an obtained signal to a multiplexer (MUX) in downlink, and also configured to perform low-noise amplification on a signal transmitted from the MUX, adjust an obtained signal by a specified gain, and monitor a level in uplink.

The remote portion may also include an LAA RM (LRM) connected to the ORU and configured to separate an LAA signal into a DL path and an UL path, and configured to adjust a signal by a specified gain, monitor a level, perform high-power amplification, and transmit an obtained signal to the MUX in downlink, and also configured to perform low-noise amplification on a signal transmitted from the MUX, adjust a signal by a specified gain, and monitor a level in uplink.

The remote portion may also include the MUX connected to the RM and the LRM and configured to connect the RM and the LRM to the antenna.

Additional aspects of example embodiments will be set forth in part in the description which follows and, in part, will be apparent from the description, or may be learned by practice of the disclosure.

According to example embodiments described herein, a base transceiver station (BTS) apparatus for a licensed-assisted access (LAA) is provided to achieve the following advantageous effects.

First, the BTS apparatus may be used to improve an issue of a shadow in a licensed band or spectrum between a BTS and user equipment (UE), and also improve an issue of an LAA service shadow between an LAA BTS (LBTS) and an LAA UE (LUE).

Second, it is possible to support an LAA service simply by adding an apparatus supporting LAA to each of a head end and a remote portion of an existing BTS apparatus, for example, a distributed antenna system (DAS).

Advantageous effects obtainable from the present disclosure are not limited to the aforementioned effect. Thus, other effects may be clearly understood from the following description by those having ordinary skill in the technical field to which the present disclosure pertains.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION OF THE DISCLOSURE

Figure 1:
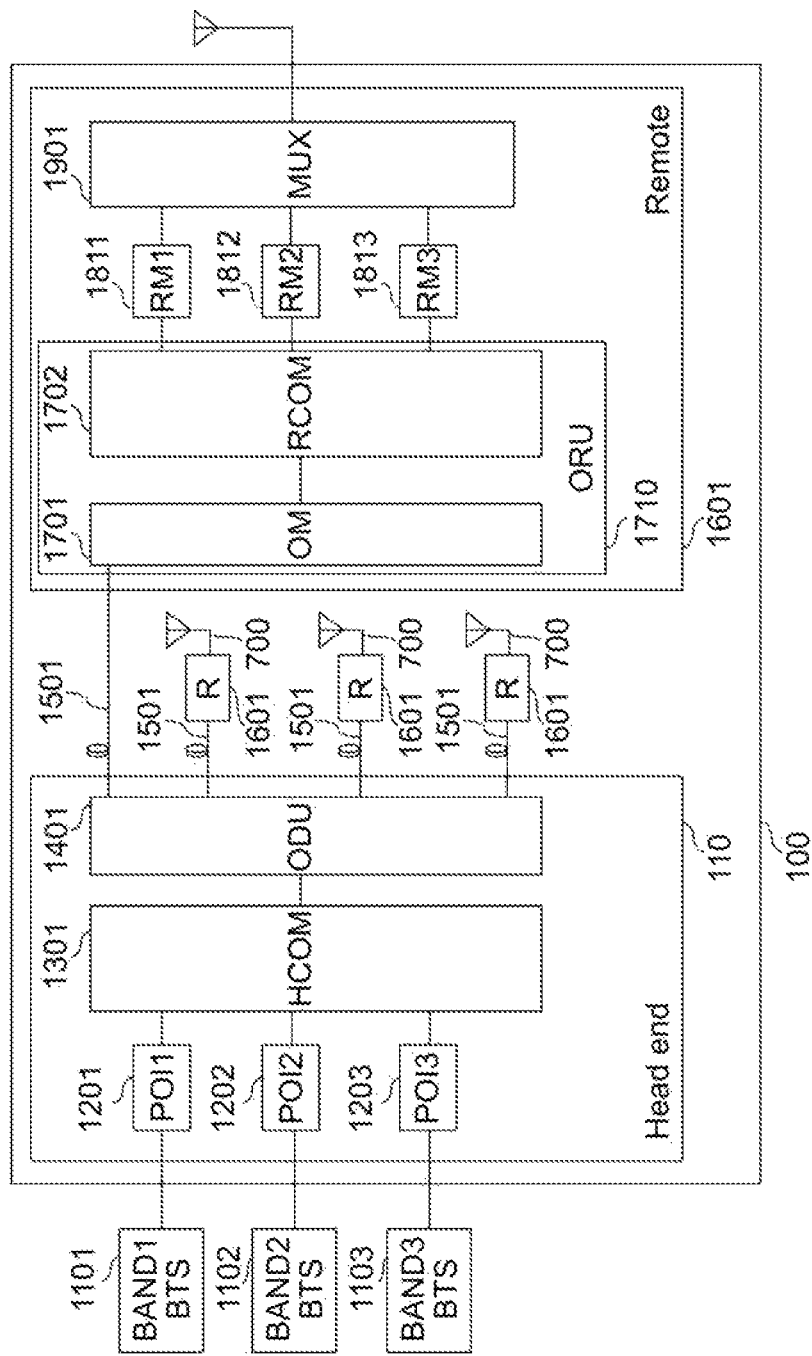
FIG. 1 illustrates an example of an existing base transceiver station (BTS) apparatus supporting multiband and multicarrier according to related arts.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. The configuration and effects thereof can be clearly understood from the following description.

FIG. 1 illustrates a configuration of an existing base transceiver station (BTS) apparatus 100 connected to BTSs 1101, 1102, and 1103. Although licensed-assisted access (LAA) using an unlicensed spectrum was introduced as a solution to the exhaustion of frequency resources that is caused by an increasing number of smartphone users and a growing demand for high-capacity and high-speed mobile communication data services, the BTS apparatus 100 to be connected to a BTS for LAA may not support a corresponding service and fail to expand the service to a shadow zone.

Figure 2:
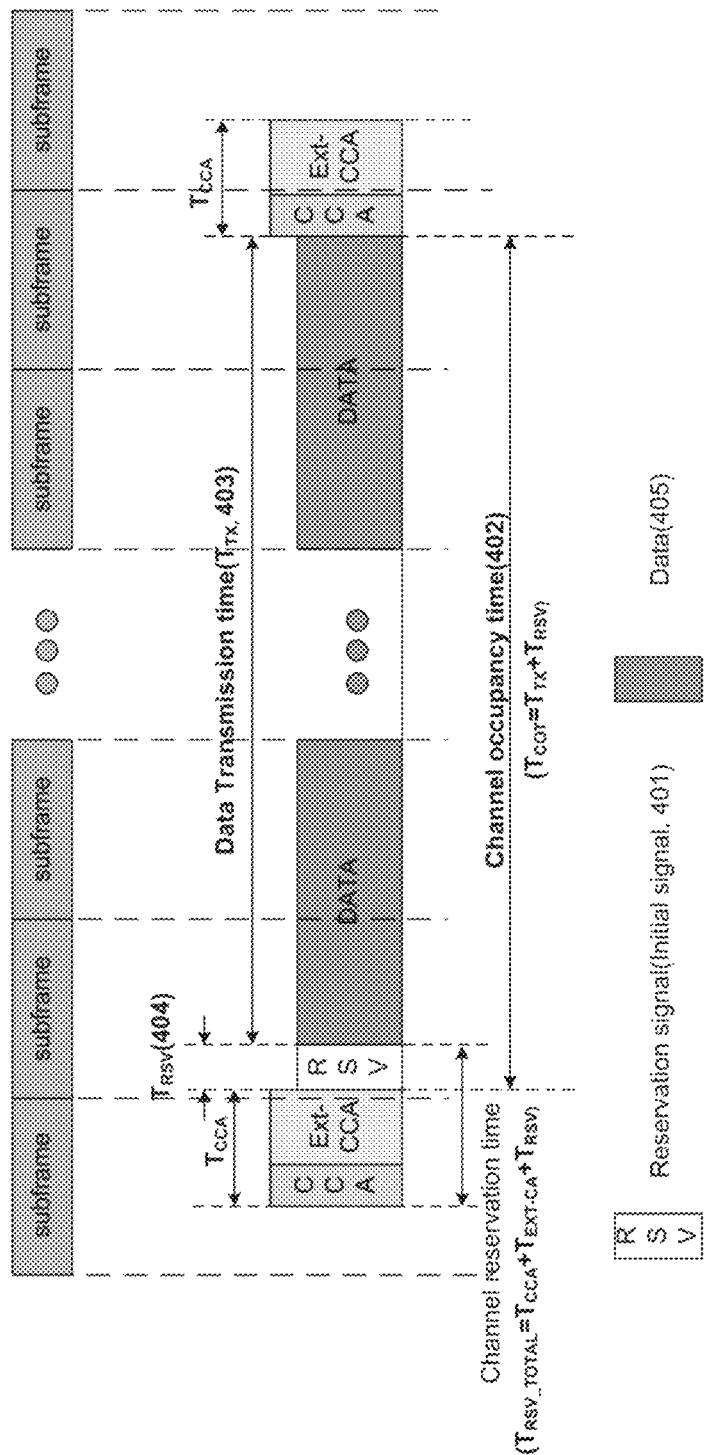
FIG. 2 illustrates an example of a frame configuration of licensed-assisted access (LAA) to an unlicensed spectrum.

FIG. 2 illustrates a frame configuration of LAA. Referring to FIG. 2, a channel occupancy time $T_{COT}$ 402 includes a time $T_{RSV}$ 404 occupied by a reservation signal RSV 401 and a data transmission time $T_{TX}$ 403 occupied by data. The RSV 401 refers to a signal present at an initial stage at which a downlink (DL) frame is started, and may prevent other devices using an unlicensed band from occupying a corresponding frequency channel at the same time before DL data 405 is transmitted.

Figure 3:
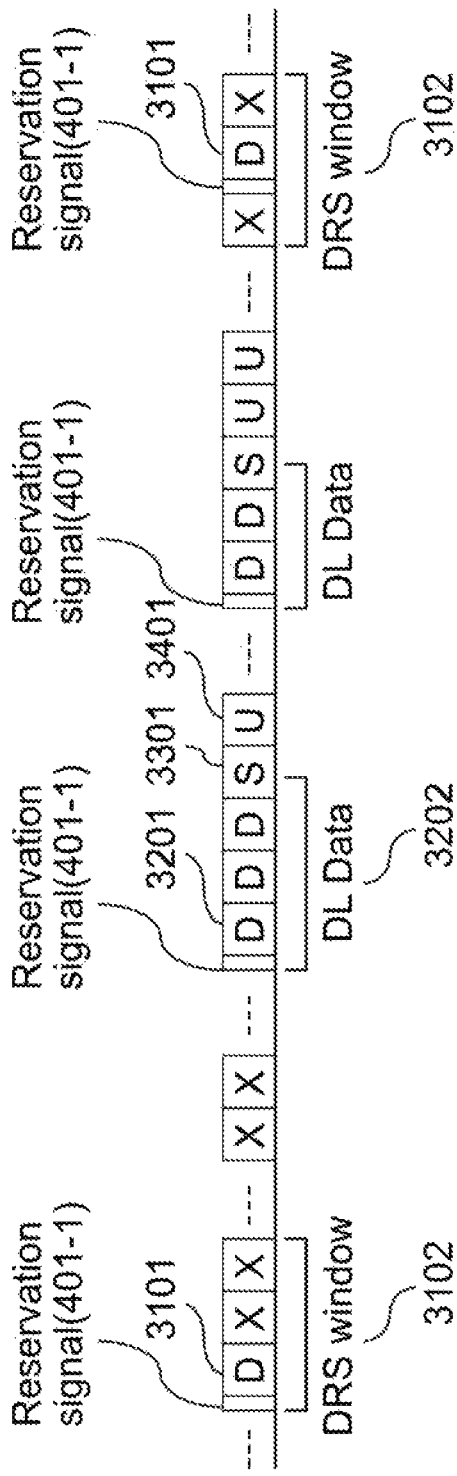
FIG. 3 illustrates an example of a frame configuration of MulteFire.

FIG. 3 illustrates an example of a frame configuration of MulteFire. Referring to FIG. 3, the frame configuration includes a periodic discovery reference signal (DRS) window 3102, a DL subframe 3201, a special subframe 3301, and an uplink (UL) subframe 3401. A reservation signal 401-1 that is similar to the RSV 401 illustrated in FIG. 2 is specified at a start of a DRS 3101 and a start of the DL subframe 3201.

Figure 10:
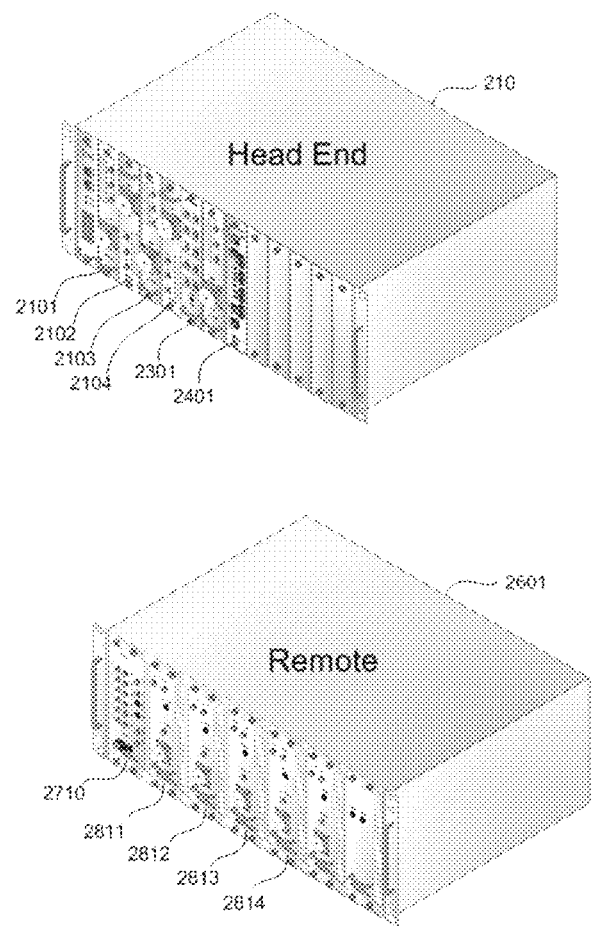
FIG. 10 illustrates oblique projection views of an example of a multiband and multicarrier BTS apparatus supporting LAA to an unlicensed spectrum according to an example embodiment.

FIG. 10 illustrates oblique projection views of an example of a multiband and multicarrier BTS apparatus 200 supporting LAA according to an example embodiment. Referring to FIG. 10, the BTS apparatus 200 includes a head end 210 and a remote portion 2601. The head end 210 may perform level monitoring and gain control for each band and carrier on a DL signal input from each of multiple BTSs 1101, 1102, 1103, and 1104 for each carrier that are present for multiple bands and carriers, respectively, and include an LAA service, combine signals for each of the bands and carriers into a single line, and transmit a signal obtained through the combining to the remote portion 2601, and also adjust an UL signal input from the remote portion 2601 to have a desirable level for each of the bands and carriers and transmit the adjusted signal to a BTS for each of the carriers. The head end 210 includes points of interface (POIs) 2101, 2102, and 2103 that interface with the BTSs 1101, 1102, and 1103, respectively, through a radio frequency (RF) line for each of the bands and carriers, and are configured to separate a BTS signal into a DL path and an UL path and adjust a signal by a desirable gain and monitor a level.

The head end 210 also includes an LAA POI (LPOI) 2104 that interfaces with an LAA BTS (LBTS) 1104 through an RF line, and is configured to separate a signal of the LBTS 1104 into a DL path and an UL path and adjust a signal by a desirable gain and monitor a level.

The head end 210 also includes a head end combiner (HCOM) 2301 that is connected to the POIs 2101, 2102, and 2103 for the respective bands or carriers and to the LPOI 2104, and is configured to combine signals of the POIs 2101, 2102, and 2103 and the LPOI 2104 to transmit the combined signal to an optic distribution unit (ODU) 2401 in downlink, and is also configured to distribute a signal of the ODU 2401 to the POIs 2101, 2102, and 2103 and the LPOI 2104 in uplink.

The head end 210 also includes the ODU 2401 that is connected to the HCOM 2301, and is configured to perform electric to optic conversion and optic distribution to transmit an obtained signal to the remote portion 2601 through an optic line 1501 in downlink, and is also configured to perform optic to electric conversion on an optic signal transmitted from the remote portion 2601 through the optic line 1501 and transmit an obtained signal to the HCOM 2301 in uplink.

The head end 210 also includes an LPOI controller (LPOIC) 6500 configured to control the LPOI 2104 and monitor a state of the LPOI 2104.

In addition, the BTS apparatus 200 also includes the remote portion 2601. The remote portion 2601 includes an optic remote unit (ORU) 2710 that is connected to the head end 210 through the optic line 1501, and is configured to perform optic to electric conversion to transmit an obtained signal to remote modules (RMs) 2811, 2812, and 2813 in downlink, and is also configured to perform electric to optic conversion on a signal transmitted from the RMs 2811, 2812, and 2813 and transmit an obtained signal to the ODU 2401 of the head end 210 through the optic line 1501 in uplink.

The remote portion 2601 also includes the RMs 2811, 2812, and 2813 that are classified by band and connected to the ORU 2710 and configured to separate a DL path and an UL path, and are configured to adjust a gain by a desirable level, monitor a level, and perform high-power amplification to transmit an obtained signal to a multiplexer (MUX) 2901 in downlink, and are also configured to perform low-noise amplification on a signal transmitted from the MUX 2901 and adjust a gain by a desirable level and monitor a level in uplink.

The remote portion 2601 also includes an LAA RM (LRM) 2814 that is connected to the ORU 2710 and configured to separate an LAA signal into a DL path and an UL path, and is configured to adjust a gain by a desirable level, monitor a level, and perform high-power amplification to transmit an obtained signal to the MUX 2901 in downlink, and is also configured to perform low-noise amplification on a signal transmitted from the MUX 2901 and adjust a gain to be a desirable level and monitor a level in uplink.

The remote portion 2601 also includes the MUX 2901 that is connected to the RMs 2811, 2812, and 2813 and the LRM 2814, and is configured to connect them to an antenna 700.

Herein, the ORU 2710 includes a remote optical module (OM) 2701 that is configured to perform optic to electric conversion on a DL optic signal transmitted from the head end 210 and transmit an obtained signal to a remote combiner (RCOM) 2702, and also is configured to perform electric to optic conversion on an UL signal input from the RCOM 2702 and transmit an obtained signal to the head end 210.

The ORU 2710 also includes the RCOM 2702 that is configured to distribute a DL signal transmitted from the OM 2701 to transmit the signal to the RMs 2811, 2812, and 2813, and the LRM 2814, and is also configured to combine UL signals transmitted to the RMs 2811, 2812, and 2813, and the LRM 2814 and transmit a signal obtained through the combining to the OM 2701.

Figure 4:
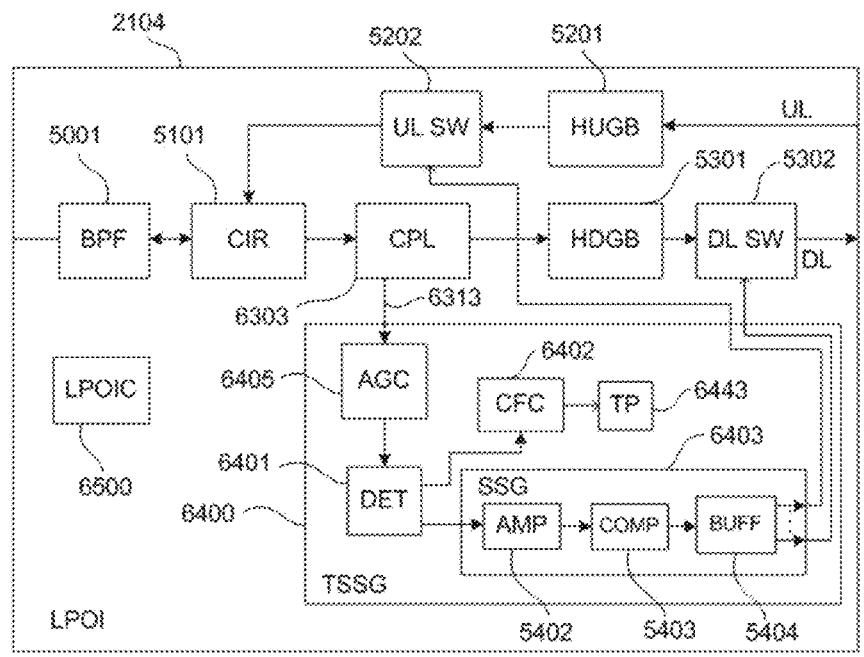
FIG. 4 illustrates an example of a configuration of an LAA point of interface (POI) (LPOI) and a time switching signal generator (TSSG) according to an example embodiment.
Figure 5:
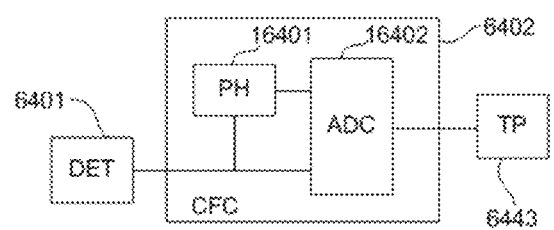
FIG. 5 illustrates an example of a configuration of a crest factor circuit (CFC) in a TSSG according to another example embodiment.

FIG. 4 illustrates an example of a configuration of the LPOI 2104. Referring to FIGS. 4 and 5, the LPOI 2104 includes a band-pass filter (BPF) 5001 that is configured to perform band-pass filtering on a DL signal input from the LBTS 1104 and input an obtained signal to a circulator (CIR) 5101, and transmit an UL signal input from the CIR 5101 to the LBTS 1104.

The LPOI 2104 also includes the CIR 5101 that is configured to transmit a DL signal input to the BPF 5001 to a coupler 6303 (CPL), and transmit a signal input from a UL switch (UL SW) 5202 to the BPF 5001 in uplink.

The LPOI 2104 also includes the CPL 6303 that is configured to transmit a DL signal to a head end DL gain block (HDGB) 5301 in downlink, and is also configured to couple a portion of the signal to transmit the coupled signal to a time switching signal generator (TSSG) 6400.

The LPOI 2104 also includes the HDGB 5301 that is configured to adjust a gain of a DL signal and monitor a level.

The LPOI 2104 also includes a DL SW 5302 configured to connect or disconnect a DL signal.

The LPOI 2104 also includes a head end UL gain block (HUGB) 5201 that is configured to adjust a gain of an UL signal and monitor a level in uplink.

The LPOI 2104 also includes the UL SW 5202 configured to connect or disconnect an UL signal.

The LPOI 2104 also includes the TSSG 6400 that is connected to the CPL 6303 as indicated by 6313, and is configured to generate a switching signal of an LAA signal and transmit the generated switching signal to the DL SW 5302 and the UL SW 5202.

Herein, the TSSG 6400 includes an automatic gain controller (AGC) 6405 that is configured to adjust a gain of a DL signal input from the CPL 6303 and output an adjusted signal at a constant level.

The TSSG 6400 also includes a detector (DET) 6401 that is configured to output, in voltage corresponding to signal strength of input by being adjusted to a constant level by the AGC 6405.

The TSSG 6400 also includes a switching signal generator (SSG) 6403 that is configured to transmit a switching signal of the DL SW 5302 and the UL SW 5202 based on a voltage signal input from the DET 6401.

Figure 7:
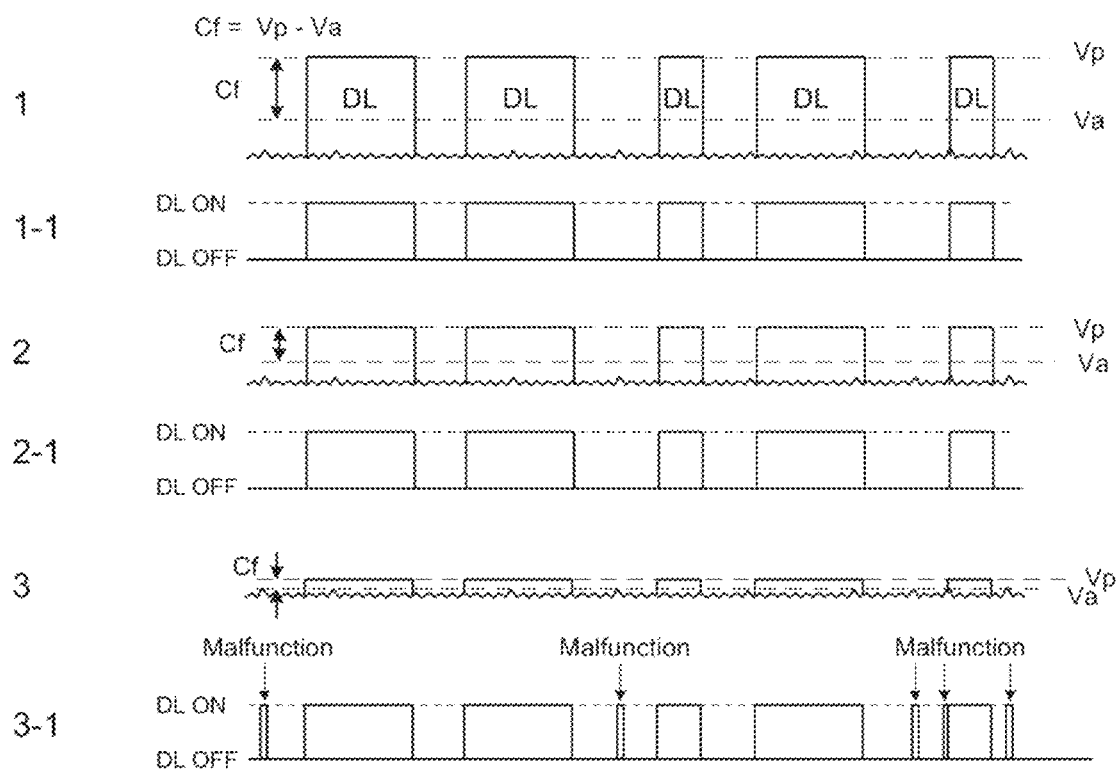
FIG. 7 illustrates examples of how an output signal based on a signal level input to a DET in a TSSG is processed by a CFC and a TSSG processor (TP)
Figure 8:
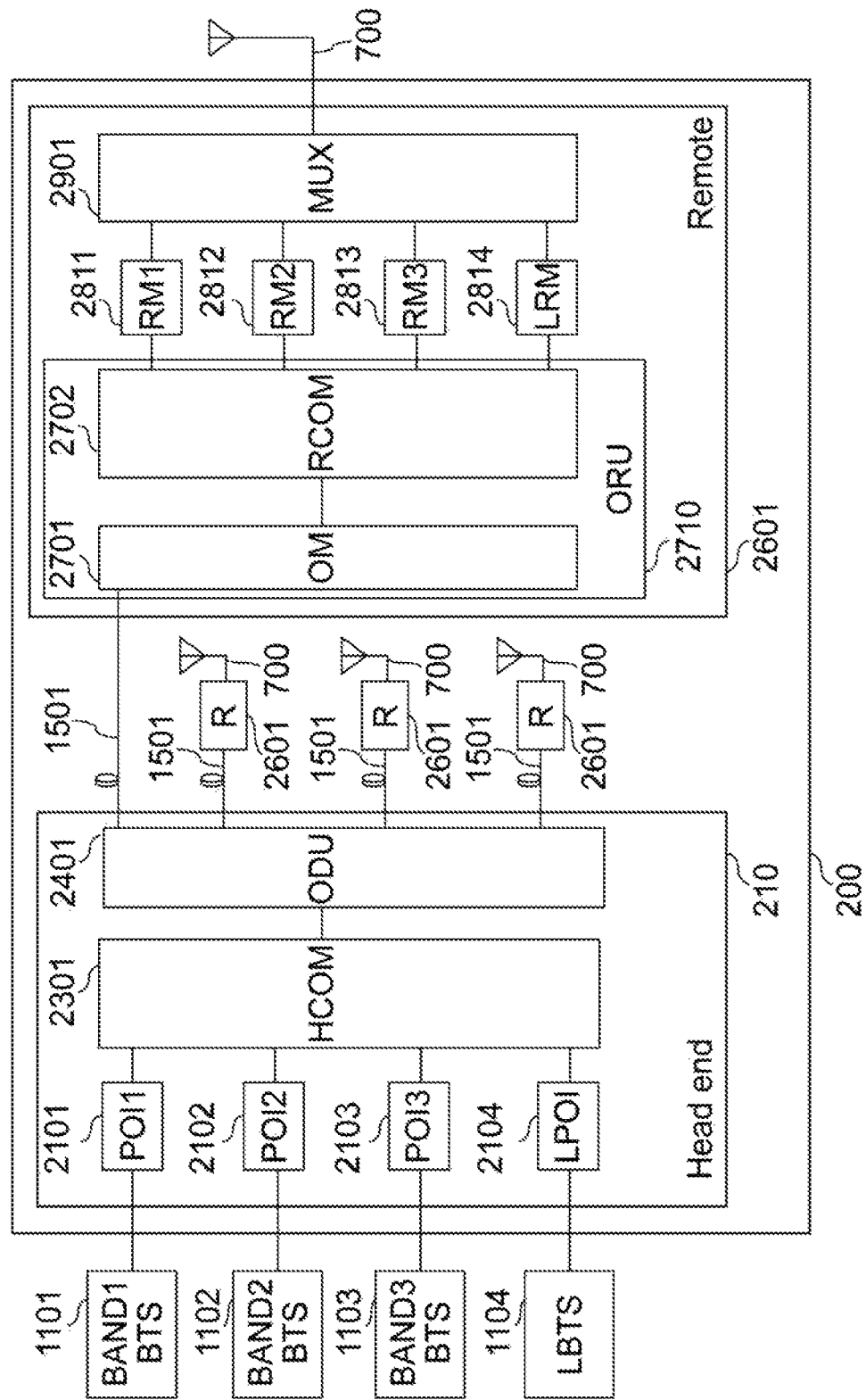
FIG. 8 illustrates an example of a configuration of a multiband and multicarrier BTS apparatus supporting LAA to an unlicensed spectrum according to an example embodiment.

The TSSG 6400 also includes a crest factor circuit (CFC) 6402 that is configured to extract a crest factor (CO as illustrated in FIG. 7 based on a voltage signal input from the DET 6401.

The TSSG 6400 also includes a TSSG processor (TP) 6443 that is configured to calculate and process the Cf based on information input from the CFC 6402.

Referring to FIG. 4, the SSG 6403 includes an amplifier (AMP) 5402 that is configured to amplify a voltage input from the DET 6401 to further expand a range of a voltage varying.

The SSG 6403 also includes a comparator (COMP) 5403 that is configured to compare a voltage with the expanded range of the voltage varying through the AMP 5402 to a reference voltage, and output a voltage corresponding to a high or low voltage signal (or an on or off voltage signal) in response to the voltage being greater or less than the reference voltage.

The SSG 6403 also includes a buffer and inverter (BUFF) 5404 that is configured to buffer and invert a signal output through the COMP 5403, and distribute an obtained signal to one or more output pins and transmit the distributed signal to the DL SW 5302 and the UL SW 5202 to connect or disconnect a DL and an UL.

Referring to FIG. 5, the CFC 6402 may distribute a signal input from the DET 6401 and maintain a peak voltage for a specified period of time through a peak hold circuit (PH) 16401, and an output therefrom may be input to an analog-to-digital converter (ADC) 16402. The signal distributed from the DET 6401 may also be input to the ADC 16402.

The ADC 16402 may receive a voltage input of each of the PH 16401 and the DET 6401, and convert the received voltage input to a digital signal and transmit the digital signal to the TP 6443.

The TP 6443 may calculate a difference between a peak value $V_p$ and an average value $V_a$ to calculate a Cf, as illustrated in FIG. 7, based on a signal input from the CFC 6402, and then compare an obtained value to a specified value to determine a normal operation and transmit a result of the determining to the LPOIC 6500.

Figure 6:
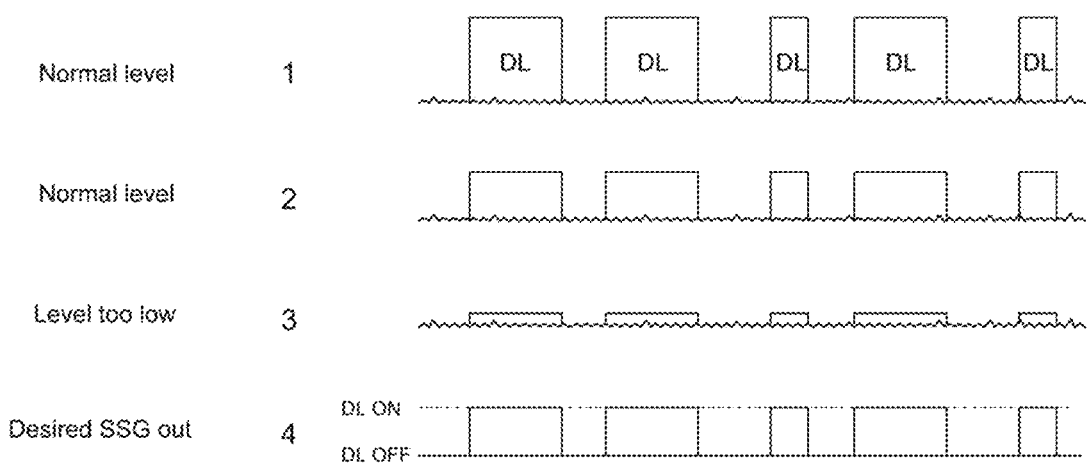
FIG. 6 illustrates examples of an output signal based on a signal level input to a detector (DET) in a TSSG.

FIG. 6 illustrates examples of an output signal of the DET 6401 based on a level input to the DET 6401, and a desired output signal of the SSG 6403.

FIG. 7 illustrates examples of an output value obtained by the CFC 6402 based on a signal for each input level illustrated in FIG. 6, and a resulting value of a Cf obtained by the TP 6443. Referring to FIG. 7, waveforms illustrated as 1 and 2 of FIG. 7 are examples at a normal level. Herein, an obtained resulting value is sufficiently great, and thus an output signal of the SSG 6403 shown in 1-1 and 1-2 may normally operate as shown in 4 of FIG. 6. However, in a case of a waveform shown in 3 of FIG. 7, a level to be input may be extremely low, and thus a difference between noise and a signal may not be sufficient and a resulting value of a Cf may be extremely low. Thus, an output signal of the SSG 6403 shown in 3-1 of FIG. 7 may be different from the waveform of 4 in FIG. 6, which may result in malfunction.

To handle such issues described in the foregoing, a process of comparing an obtained resulting value of a Cf to a specified reference value may be needed to determine normality or abnormality through a test.

Herein, in response to the normality being determined, the TP 6443 may control the SSG 6403 to normally operate. In contrast, in response to the abnormality being determined, the TP 6443 may suspend an operation of the SSG 6403 and generate an alarm.

Figure 9:
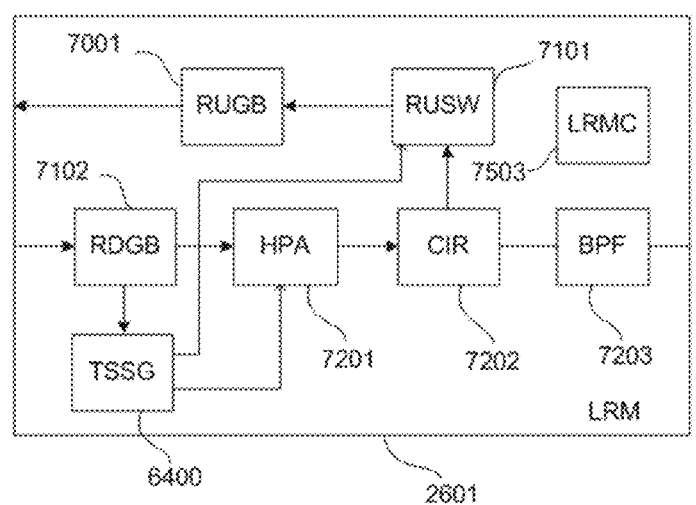
FIG. 9 illustrates an example of a configuration of an LAA remote module (RM) (LRM) according to an example embodiment.

FIG. 9 illustrates a LRM 2601 including the TSSG 6400. Referring to FIG. 9, the LRM 2601 includes a remote DL gain block (RDGB) 7102 that is configured to adjust a DL signal input from the ORU 2710 by a desirable gain and monitor a level, and transmit an adjusted signal to a high-power amplifier (HPA) 7201 and transmit a level of a specified rate to the TSSG 6400.

The LRM 2601 also includes the HPA 7201 that is configured to perform high-power amplification on a signal input from the RDGB 7102 and transmit an obtained signal to a remote CIR 7202.

The LRM 2601 also includes the remote CIR 7202 that is configured to transmit a signal input from the HPA 7201 to a BPF 7203 in downlink, and is also configured to transmit an UL signal input from the BPF 7203 to a remote UL SW (RUSW) 7101 in uplink.

The LRM 2601 also includes a remote UL gain block (RUGB) 7001 that is configured to adjust an UL signal input from the RUSW 7101 by a desirable gain and monitor a level.

The LRM 2601 also includes the BPF 7203 that is connected to the MUX 2901 and the remote CIR 7202, and configured to perform band-pass filtering.

The LRM 2601 also includes an LRM controller (LRMC) 7503 configured to monitor a state of the LRM 2601 and control the LRM 2601.

The LRM 2601 also includes the TSSG 6400.

In an LAA service, the SSG 6403 may detect the reservation signal RSV 401 as illustrated in FIG. 2, and allow it to operate as a starting point to turn on a DL period (DL ON). In MulteFire, the SSG 6403 may detect the reservation signal 401-1 being at a starting point of a DRS 3101 and a DL subframe 3201 as illustrated in FIG. 3, and allow it to operate as a starting point to turn on a DL period (DL ON).

Although the BTS apparatus for LAA has been described in detail above through a number of example embodiments, the present disclosure is not limited thereto and should be construed as having the widest range according to the basic spirit disclosed herein. Those skilled in the art may implement a pattern of a form not stated above by combing or replacing the disclosed example embodiments, which should also be construed as within the scope of the present disclosure. Further, it will be apparent to those skilled in the art that various modifications and variations can be easily made to these example embodiments without departing from the spirit or scope of the claims.

Therefore, the scope of the present disclosure is defined not by the detailed description, but by the claims and their equivalents, and all variations within the scope of the claims and their equivalents are to be construed as being included in the disclosure.

What is claimed is:

1. A base transceiver station (BTS) apparatus for licensed-assisted access (LAA), comprising:
    a head end connected to a BTS for each of multiple bands and carriers through a radio frequency (RF) line, and configured to adjust a downlink (DL) signal for each of the bands and carriers by a specified gain and combine adjusted signals, perform electric to optic conversion on a signal obtained through the combining, and then perform optical expansion and optical transmission, and also configured to perform optic to electric conversion on an uplink (UL) optic signal and adjust an obtained signal by a gain set for each of the bands and carriers, and then transmit an adjusted signal to the BTS for each of the bands and carriers, to enable an LAA service for an unlicensed spectrum; and a remote portion connected to one of optic lines that are optically expanded from the head end, and configured to perform optic to electric conversion on a DL optic signal, adjust an obtained signal by a level set for each of the bands, perform high-power amplification on an adjusted signal, multiplex a signal obtained through the high-power amplification for each of the bands, and then transmit a multiplexed signal through an antenna, and also configured to perform low-noise amplification on an UL signal input through the antenna and perform electric to optic conversion on a signal obtained through the low-noise amplification, and then optically transmit an obtained signal to the head end, to enable an LAA service for a licensed spectrum and an unlicensed spectrum wherein the head end comprises:

a point of interface (POI) connected to the BTS for each of the bands and carriers through the RF line, and configured to separate a BTS signal into a DL path and an UL path, and adjust a signal by a specified gain and monitor a level;

an LAA POI (LPOI) connected to an LAA BTS (LBTS) through the RF line, and configured to separate a signal of the LBTS into a DL path and an UL path, and adjust a signal by a specified gain and monitor a level;

a head end combiner (HCOM) connected to the POI for each of the bands or carriers and the LPOI, and configured to combine signals of the POI and the LPOI and transmit a signal obtained through the combining to an optic distribution unit (ODU) in downlink, and also configured to distribute a signal of the ODU to the POI and the LPOI in uplink;

the ODU connected to the HCOM, and configured to perform electric to optic conversion and optic distribution and transmit an obtained signal to the remote portion through an optic line in downlink, and also configured to perform optic to electric conversion on an optic signal transmitted from the remote portion through the optic line and transmit an obtained signal to the HCOM in uplink; and an LPOI controller (LPOIC) configured to control the LPOI and monitor a state of the LPOI, wherein the LPOI comprises:

a band-pass filter (BPF) configured to perform band-pass filtering on a DL signal input from the LBTS and input an obtained signal to a circulator (CIR), and transmit an UL signal input from the CIR to the LBTS; and the CIR configured to transmit the DL signal input to the BPF to a coupler (CPL), and transmit a signal input from an UL switch (UL SW) to the BPF in uplink;

the CPL configured to transmit the DL signal to a head end DL gain block (HDGB) in downlink, and couple a specified amount of the signal and transmit the coupled signal to a time switching signal generator (TSSG);

a DL switch (DL SW) configured to connect or disconnect the DL signal;

a head end UL gain block (HUGB) configured to adjust a gain of an UL signal and monitor a level in uplink;

the UL SW configured to connect or disconnect the UL signal; and the TSSG connected to the CPL, and configured to generate a switching signal of an LAA signal and transmit the generated switching signal to the DL SW and the UL SW, wherein the remote portion comprises:

an optic remote unit (ORU) connected to the head end through an optic line, and configured to perform optic to electric conversion and transmit an obtained signal to a remote module (RM) and an LAA RM (LRM) in downlink, and also configured to perform electric to optic conversion on a signal transmitted from the RM and the LRM and transmit an obtained signal to the ODU of the head end through the optic line in uplink;

the RM classified by each of the bands and connected to the ORU and configured to separate a DL path and an UL path, and configured to adjust a signal by a specified level, monitor a level, perform high-power amplification, and then transmit an obtained signal to a multiplexer (MUX) in downlink, and also configured to perform low-noise amplification on a signal transmitted from the MUX, adjust an obtained signal by a specified gain, and monitor a level in uplink;

the LRM connected to the ORU and configured to separate an LAA signal into a DL path and an UL path, and configured to adjust a signal by a specified gain, monitor a level, perform high-power amplification, and transmit an obtained signal to the MUX in downlink, and also configured to perform low-noise amplification on a signal transmitted from the MUX, adjust a signal by a specified gain, and monitor a level in uplink; and the MUX connected to the RM and the LRM for each of the bands and configured to connect the RM and the LRM to the antenna, wherein the LRM comprises:

a remote DL gain block (RDGB) configured to adjust a DL signal input from the ORU by a specified gain and monitor a level, and transmit an adjusted signal to a high-power amplifier (HPA) and transmit a level of a specified rate to the TSSG;

the HPA configured to perform high-power amplification on a signal input from the RDGB and transmit the amplified signal to a CIR;

a remote CIR configured to transmit a signal input from the HPA to a BPF in downlink, and transmit an UL signal input from the BPF to a remote UL SW (RUSW) in uplink;

a remote UL gain block (RUGB) configured to adjust an UL signal input from the RUSW by a specified gain and monitor a level in uplink;

the BPF connected to the MUX and the remote CIR, and configured to perform band-pass filtering; and an LRM controller (LRMC) configured to monitor a state of the LRM and control the LRM.

2. The BTS apparatus of claim 1, wherein the TSSG comprises:

an automatic gain controller (AGC) configured to adjust a gain of a DL signal input from the CPL and output the adjusted signal at a constant level;

a detector (DET) configured to output, as a voltage, an intensity of a signal input from the AGC;

a switching signal generator (SSG) configured to transmit a switching signal to the DL SW and the UL SW based on a voltage signal input from the DET;

a crest factor circuit (CFC) configured to extract a crest factor based on the voltage signal input from the DET; and a TSSG processor (TP) configured to calculate and process the crest factor based on information transmitted from the CFC.

3. The BTS apparatus of claim 2, wherein the SSG comprises:

an amplifier (AMP) configured to amplify a voltage input from the DET and expand range of voltage varying;

a comparator (COMP) configured to compare an output voltage of the AMP and a specified reference voltage, and output a voltage corresponding to a high or low voltage signal, or an on or off voltage signal, that is greater or less than the reference voltage; and a buffer and inverter (BUFF) configured to buffer and invert a signal output through the COMP, and distribute an obtained signal to one or more output pins to be transmitted to the DL SW and the UL SW to turn on or off.

4. The BTS apparatus of claim 2, wherein the CFC comprises:

a peak hold circuit (PH) configured to maintain a peak voltage of a signal input from the DET for a specified period of time and then transmit the signal to an analog-to-digital converter (ADC);

the ADC configured to convert each of signals received from the PH and the DET to a digital signal and transmit the digital signal to the TP; and the TP configured to calculate a difference between a peak value and an average value based on a signal input from the CFC through the ADC and a signal input from the DET through the ADC and calculate the crest factor, compare the crest factor and a specified comparison value and determine whether a signal is normal or not, and then transmit a result of the determining to the LPOIC.

5. The BTS apparatus of claim 2, wherein the SSG is further configured to operate as a starting point at which to turn on a DL period for an LAA service by detecting a reservation signal and operate as a starting point at which to turn on a DL period for an MulteFire service by detecting a reservation signal at a starting point of a DRS and a DL subframe.

* * * * *